US012259551B2

United States Patent
Lee (10) Patent No.: US 12,259,551 B2
(45) Date of Patent: Mar. 25, 2025

(54) AUGMENTED REALITY WEARABLE ELECTRONIC DEVICE PREVENTING LUMINANCE INTERFERENCE WITH A USER

(71) Applicant: Samsung Electronics Co., Ltd., Gyeonggi-do (KR)

(72) Inventor: Donghi Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 628 days.

(21) Appl. No.: 17/522,493

(22) Filed: Nov. 9, 2021

(65) Prior Publication Data

US 2022/0155598 A1    May 19, 2022

Related U.S. Application Data

(63) Continuation of application No. PCT/KR2021/015019, filed on Oct. 25, 2021.

(30) Foreign Application Priority Data

Nov. 19, 2020  (KR) .................. 10-2020-0155204

(51) Int. Cl.
  *G02B 27/01*   (2006.01)
  *G02B 5/10*    (2006.01)
  (Continued)

(52) U.S. Cl.
  CPC .......... *G02B 27/0172* (2013.01); *G02B 5/10* (2013.01); *G02B 26/10* (2013.01); *G02C 5/22* (2013.01);
  (Continued)

(58) Field of Classification Search
  CPC .......... G02C 5/00; G02C 5/003; G02C 5/005; G02C 5/22; G02B 26/00; G02B 26/08; G02B 26/0816; G02B 26/0833; G02B 26/10; G02B 27/01; G02B 27/017; G02B 27/0101; G02B 27/0172; G02B 27/0178;
  (Continued)

(56) References Cited

U.S. PATENT DOCUMENTS 10,078,223 B2   9/2018  Magyari
10,409,073 B2   9/2019  Ellsworth et al.
(Continued)

FOREIGN PATENT DOCUMENTS

JP   2010-136443    6/2010
JP   2016-536635    11/2016
(Continued)

OTHER PUBLICATIONS

International Search Report dated Feb. 4, 2022 Issued in counterpart application No. PCT/KR2021/015019, 13 pages.

*Primary Examiner* — Sultan Chowdhury
(74) *Attorney, Agent, or Firm* — The Farrell Law Firm, P.C.

(57) ABSTRACT

Disclosed is a wearable electronic device including a frame, a pair of window members supported by the frame, a pair of leg members rotatably connected to the frame, at least one display module disposed between the pair of window members, and at least one mirror member configured to reflect light emitted from the at least one display module and cause the emitted light to reach at least one of the pair of window members.

10 Claims, 8 Drawing Sheets

(51) Int. Cl.
  *G02B 26/10* (2006.01)
  *G02C 5/22* (2006.01)
  *G02C 11/00* (2006.01)
(52) U.S. Cl.
  CPC ...... *G02C 11/10* (2013.01); *G02B 2027/0178* (2013.01)
(58) Field of Classification Search
  CPC ... G02B 5/09; G02B 5/10; G02B 5/12; G02B 5/124; G02B 2027/0107; G02B 2027/0172; G02B 2027/0178; G02B 2027/0179
  See application file for complete search history.

(56) References Cited

U.S. PATENT DOCUMENTS

| | | |
|---|---|---|
| 10,416,458 B2 | 9/2019 | Schultz et al. |
| 2004/0240072 A1 | 12/2004 | Schindler et al. |
| 2010/0060551 A1* | 3/2010 | Sugiyama ............... G02B 26/06 353/31 |
| 2015/0168730 A1* | 6/2015 | Ashkenazi ......... G02B 27/0176 359/630 |
| 2017/0011706 A1* | 1/2017 | Namkung ............... G06F 1/163 |
| 2017/0090514 A1 | 3/2017 | Byun et al. |
| 2019/0079302 A1* | 3/2019 | Ninan .................... G06F 1/163 |
| 2019/0187472 A1 | 6/2019 | Choi et al. |
| 2019/0235252 A1* | 8/2019 | Freedman ......... G02B 27/0172 |
| 2019/0278088 A1 | 9/2019 | Asaf et al. |
| 2019/0285899 A1 | 9/2019 | Levola et al. |
| 2019/0346928 A1* | 11/2019 | Shahmohammadi ........................ H04B 13/005 |
| 2019/0384065 A1* | 12/2019 | Shau ..................... G02C 11/10 |
| 2020/0049992 A1* | 2/2020 | Peng ..................... G06F 3/012 |
| 2020/0143759 A1* | 5/2020 | Lee ........................ G09G 3/36 |
| 2020/0209360 A1 | 7/2020 | Holleczek et al. |

FOREIGN PATENT DOCUMENTS

| | | |
|---|---|---|
| JP | 2019-521384 | 7/2019 |
| KR | 1020160005681 | 1/2016 |
| KR | 1020170037355 | 4/2017 |
| KR | 1020190072838 | 8/2019 |
| KR | 1020200011960 | 2/2020 |

* cited by examiner

AUGMENTED REALITY WEARABLE ELECTRONIC DEVICE PREVENTING LUMINANCE INTERFERENCE WITH A USER

CROSS-REFERENCE TO RELATED APPLICATIONS

This application is a Bypass Continuation application of International Application No. PCT/2021/015019, which was filed on Oct. 25, 2021, and is based on and claims priority under 35 U.S.C. § 119 to Korean Patent Application No. 10-2020-0155204, filed on Nov. 19, 2020, in the Korean Intellectual Property office, the disclosures of each of which being incorporated by reference herein in their entireties.

BACKGROUND

1. Field

The disclosure relates generally to an electronic device, and more particularly, to an augmented reality (AR) wearable electronic device including an AR function.

2. Description of Related Art

The expression "AR" refers to a technology that adds elements generated through computer graphic processing to actual reality recognized by a user. For example, the AR technology may be used for displaying an object existing in reality while adding a virtual object including information related to that object.

The AR technology may be implemented through various devices, such as a glasses-type wearable electronic device or a head mounted display (HMD).

In order to implement AR in the glasses-type wearable electronic device, an image may be displayed on the lens of the glasses. Projecting light onto the lens of the glasses enables the display of an image on the lenses. For example, a projector with a very small size (e.g., a micro projector or a pico projector) may be used. As examples of such a projector, there are a laser scanning display (LSD), a digital micro-mirror display (DMD), and a liquid crystal on silicon (LCoS). An image may also be displayed on the lens using a transparent display.

In an electronic device including a lens, a projector may be used to display an image on the lens. For wearing convenience, a wearable electronic device tends to have a very limited space in which electronic components are disposed.

A conventional glasses-type electronic device including a projector is manufactured such that the projector is disposed at both sides of the device, namely, between user's eyes and ears. Thus, a problem tends to occur in which light (luminance) emitted from the projector interferes with a user's body. When the projector is placed close to the lens in an effort to avoid such interference, an angle of view is limited. In addition, interference may also be caused when folding temples for storage of the glasses-type electronic device.

As such, there is a need in the art for an AR wearable electronic device in which light emitted from a projector does not interfere with a user's body and no interference is caused when the temples are folded.

SUMMARY

Aspects of the disclosure are to address at least the above-mentioned problems and/or disadvantages and to provide at least the advantages described below. Accordingly, an aspect of the disclosure is to provide a wearable electronic device that prevents light for displaying an image from interfering with a user's body.

Another aspect of the disclosure is to provide a wearable electronic device that may be easily stored by folding some components of the electronic device.

Another aspect of the disclosure is to provide a wearable electronic device that increases the size of the displayed image.

In accordance with an aspect of the disclosure, an electronic device may include a frame, a pair of window members supported by the frame, a pair of leg members rotatably connected to the frame, at least one display module disposed between the pair of window members, and at least one mirror member configured to reflect light emitted from the at least one display module and cause the emitted light to reach at least one of the pair of window members.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Hereinafter, embodiments of the disclosure will be described in detail with reference to accompanying drawings. Descriptions of well-known functions and constructions are omitted for the sake of clarity and conciseness.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element)

is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Figure 1:
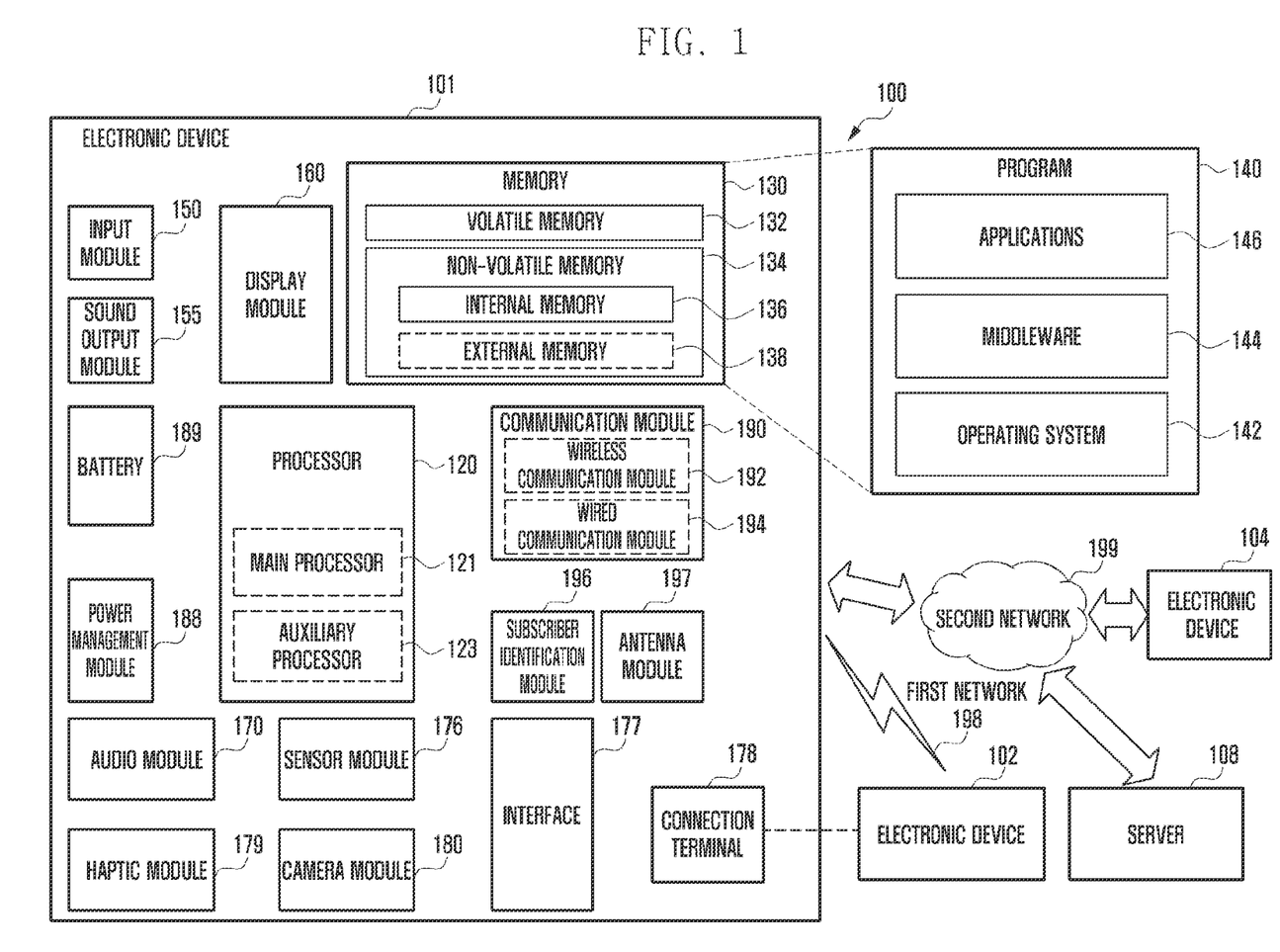
FIG. 1 illustrates an electronic device in a network environment, according to an embodiment.

FIG. 1 illustrates an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123, According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104 or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC), The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101, According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna, module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network, According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
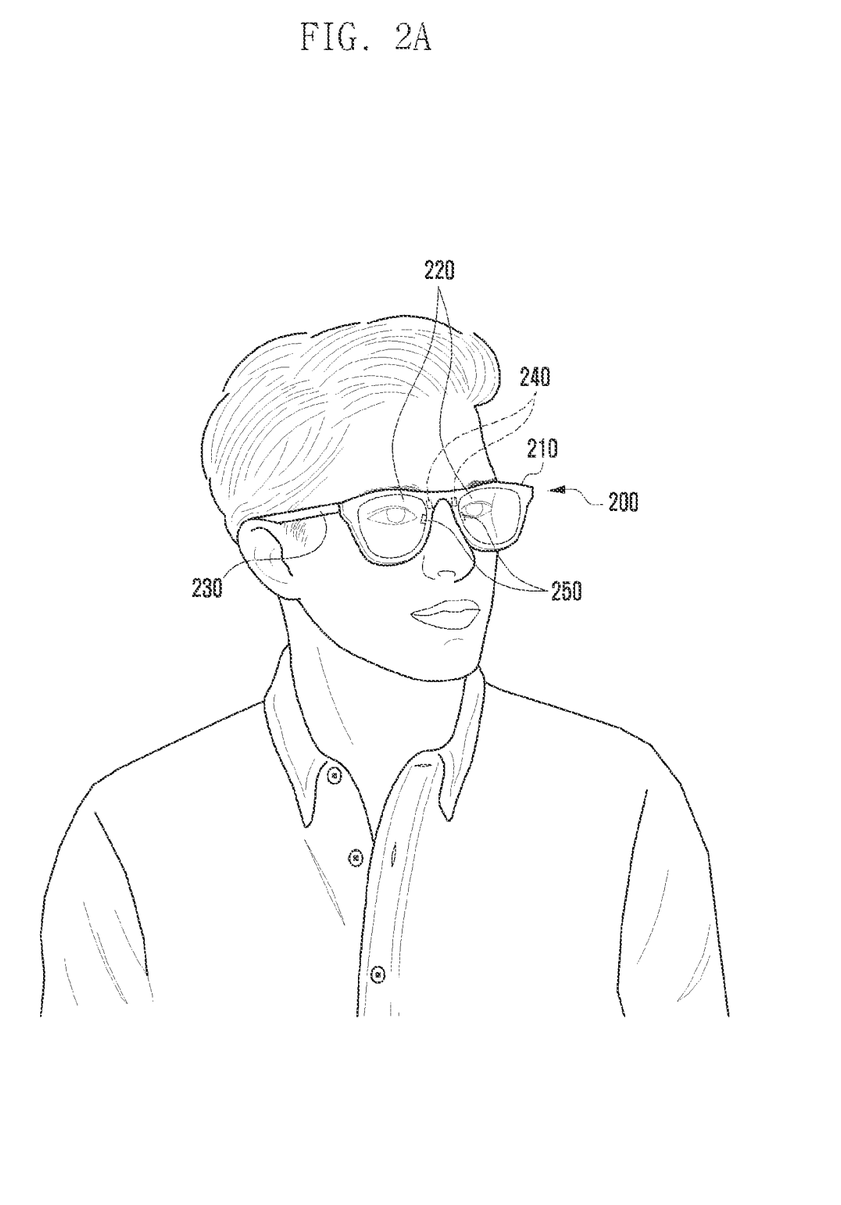
FIG. 2A illustrates a wear state of an electronic device according to an embodiment.
Figure 3A:
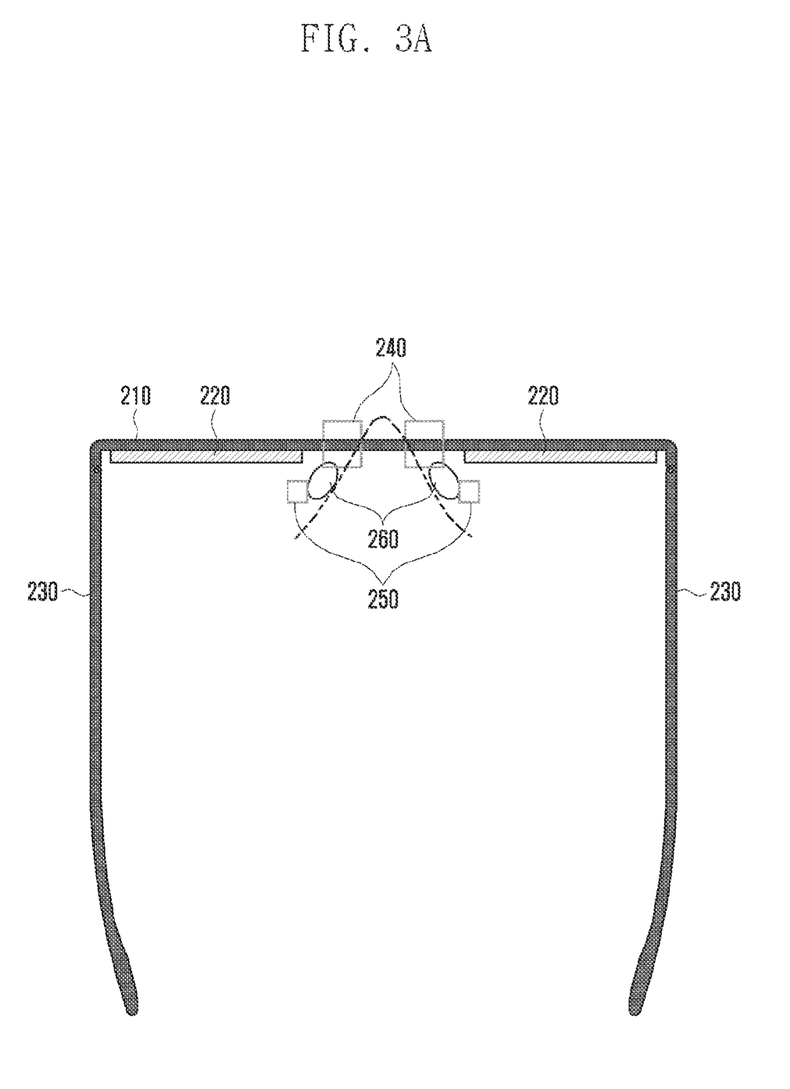
FIGS. 3A and 3B illustrate, as viewed from above, an electronic device according to an embodiment.
Figure 3B:
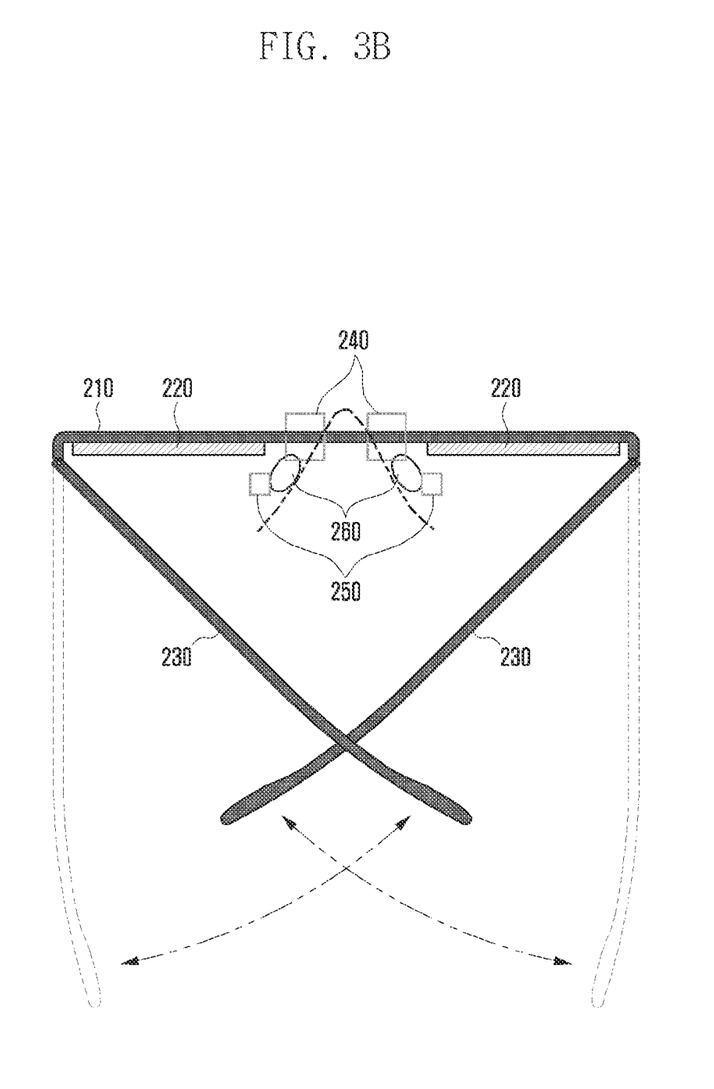

FIG. 2A illustrates a wear state of an electronic device according to an embodiment. FIGS. 3A and 3B illustrate, as viewed from above, an electronic device according to an embodiment.

An electronic device 200 may be a wearable electronic device 200 that can be worn on a user's body, such as a glasses-type electronic device 200 as shown in FIG. 2A.

The electronic device 200 may include a frame 210, a support member 260, a window member 220, a leg member 230, a display module 240, and a mirror member 250. Components of the electronic device 200 are not limited to those shown in FIGS. 2 and 3A, Some components of the electronic device 200 may be omitted or added in order to modify design elements or functions within a range that can be understood by a person skilled in the art.

The frame 210 may be configured to support other components of the electronic device 200, Since the electronic device 200 is wearable on a user's body, the frame 210 is preferably made of a material having a light weight and high strength. For example, the frame 210 may be formed of a synthetic resin such as acetate or epoxy resin, or a metal or alloy material such as titanium or stainless steel.

The support member 260 may be coupled to the frame 210 and may be supported by at least a part of the user's body when the electronic device 200 is worn. For example, the support member 260 may be disposed at a central portion of the frame 210 and supported by the user's nose in a wear state of the electronic device 200. In consideration of wearability a portion of the support member 260 in contact with the user's nose may be made of a material having high elasticity, such as rubber or silicone.

There may be a pair of window members 220 supported by the frame 210. The pair of window members 220 may be disposed in openings provided in the frame 210 at positions corresponding to the pair of user's eyes. At least a portion of the window member 220 may be formed of a material having high light transmittance, A surface of the window member 220 may be coated with various materials in consideration of optical performance. For example, the window member 220 may be coated to have at least one function of ultraviolet rays blocking, scratch prevention, blue light blocking, fogging prevention, light reflection prevention, and heat resistance. In addition, on the surface of the window member 220 facing the user's eyes, a material capable of reflecting light emitted from the display module 240 may be coated so that the light emitted from the display module 240 and reaching the window member 220 can be perceived by the user's eyes, as will be described herein.

A pair of leg members 230 (i.e., temples) may be rotatably coupled to both ends of the frame 210, respectively. As shown in FIG. 3B, the volume of the electronic device 200 is reduced through the rotation of the leg member 230 with respect to the frame 210, so that the electronic device 200 can be easily accommodated. In the electronic device 200, because the display module 240 is disposed at a central portion of the frame 210, no interference with the display module 240 occurs in the rotation of the leg member 230 with respect to the frame 210. The pair of leg members 230 may be supported by the user's ears while the electronic device 200 is worn, in this manner, the electronic device 200 may be stably positioned on the user's head.

The display module 240 may convert an image signal into light. The image signal converted by the display module 240 may be processed by a processor 120 of the electronic device 200 and may be received from an external electronic device through a communication module 190. As shown in FIGS. 2 and 3A, the display module 240 may be disposed between the pair of window members 220. Two display modules 240 may be disposed to correspond to the window members 220, respectively. It is also possible to use only one display module 240. In this case, light emitted from the display module 240 may reach only one member of the pair of window members 220. Alternatively, light distributed from one display module may reach each member of the pair of window members 220 (see FIG. 5). The display module 240 may be permanently or detachably installed on the support member 260 or the frame 210. The user may remove the display module 240 as necessary.

The mirror member 250 may be disposed between the window member 220 and the display module 240. The mirror member 250 may be formed of a material capable of reflecting light. Light emitted from the display module 240 may be reflected by the mirror member 250 and then reach the window member 220. The mirror member 250 may be permanently or detachably installed on the support member 260. The user may remove the mirror member 250 as necessary.

As light emitted from the display module 240 is reflected by the mirror member 250 and then reaches the window member 220, an image may be displayed on the window member 220. Such an image displayed on the window member 220 is added to the real world recognized by the user through the window member 220, so that AR may be implemented.

Figure 2B:
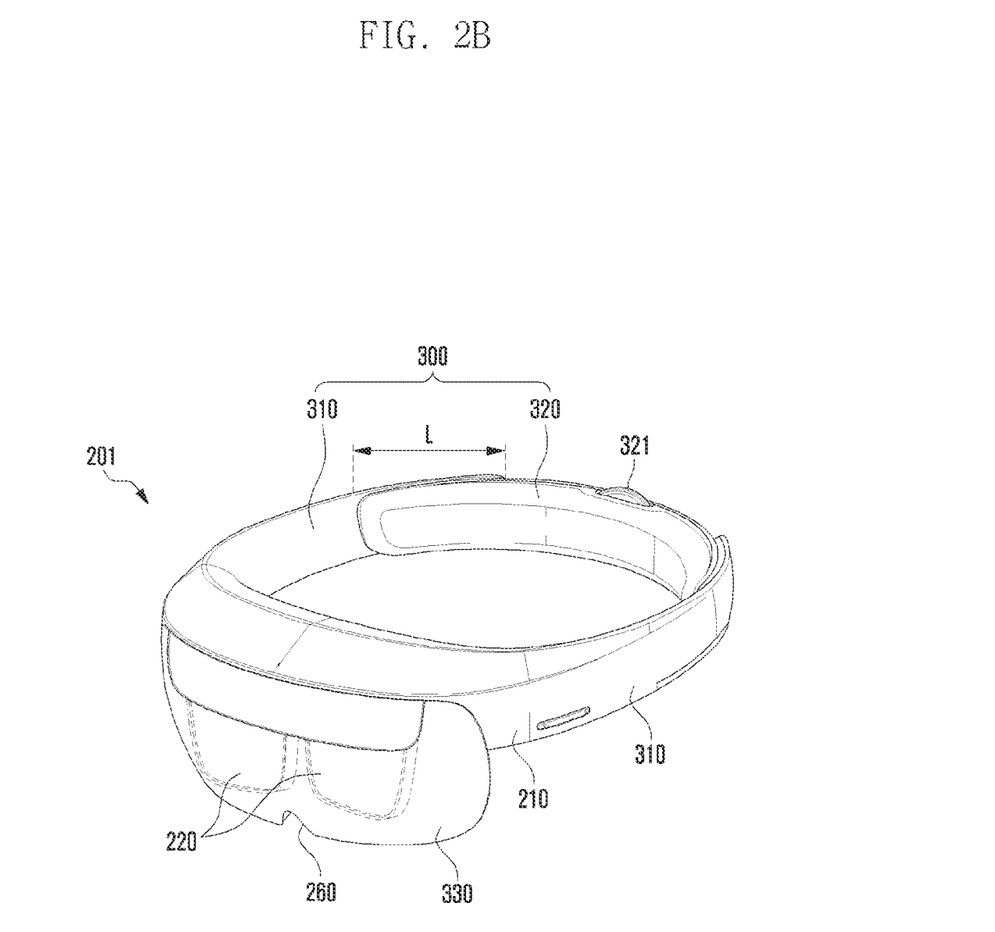
FIG. 2B illustrates a perspective view of an electronic device according an embodiment.

FIG. 2B is a diagram illustrating a perspective view of an electronic device according to various embodiments of the disclosure. Previously, the electronic device 200 is described as glasses shape electronic device. The electronic device may be various electronic devices configured to be worn user's head. For example, refer to FIG. 2B, the electronic device 201 may be configured to be inserted the user's head.

According to various embodiments, the electronic device may include a frame 210, a support member 360, a window member 220, a wearing member 300, a display module (e.g., the display module 240 in FIG. 2B) and a mirror member (e.g., the mirror member 250 in FIG. 2A). The electronic device in FIG. 2B may be similar to the electronic device in FIG. 2A. However, a wearing method and a shape may of the electronic device in FIG. 2B is different from the electronic device in FIG. 2A. Hereinafter, the same or similar reference numerals may be used for the same or similar components and repeated description may be simply.

According to various embodiments, a pair of the window members 220 which corresponds to the user's eyes may be disposed on the frame 210 of the electronic device 201. The display module may be disposed between the pair of the window members 220. Light emitted from the display module is projected onto the pair of window members 220, so that the user can recognize information projected on the window member 220. In the case of the electronic device 201 in FIG. 2B, may further include a blocking member 330 which blocks the light entered from a front of the electronic device 201. If the blocking member 330 exists, the user may not recognize the visual information from the front but only recognize information projected onto the window member 220. In this case, the electronic device 201 may provide a virtual reality environment to the user.

According to various embodiments, the mirror member may reflect the light emitted from the display module to the pair of the window member 220. In an embodiment, the mirror member may be disposed on between the display module and the window member 220. The detailed explanation of which the light emitted from the display module is reflected by the mirror member to reach the window member 220 is refers to the descriptions of FIG. 4.

According to various embodiments, the wearing member 300 may include a band 310 configured to be worn on the user's head and an adjuster 320 configured to adjust the band 310 size. The band 310 may be coupled to both sides of the frame 210 and the adjuster 320. The band 310 and the adjuster 320 may have a ring shape that is worn on the user's head. The band 310 may be formed by an elastic material so that the band 310 may be partially deformed according to the user's head shape. In an embodiment, the adjuster 320 may adjust a size of the wearing member 300. For example, the adjuster 320 may include an adjusting wheel 321. The size of wearing member 300 may increase or decrease according to the rotation direction of the adjusting wheel 321. The user may adjust the size of wearing member 300 by rotating the adjusting wheel 321 such that the size of wearing member 300 corresponds to the size of the user's head after mounting the electronic device 201 on the user's head. The adjusting wheel 321 may adjust the size of the wearing member 300 in various way. For example, the adjusting wheel 321 may have a gear shape and the band 310 may include a gear part configured to mesh to the gear of the adjusting wheel 321.

Another example, the adjusting wheel 321 may have wired a wire and the wire may be connected to the band 310. If rotates the adjusting wheel 321, the size of the wearing member 300 may be changed by the overlap area L between the band 310 and the adjuster 320 is increased or decreased. The structure of the wearing member 300 described above is merely an example. The structure of the wearing member 300 may be changed in a various way.

Figure 4:
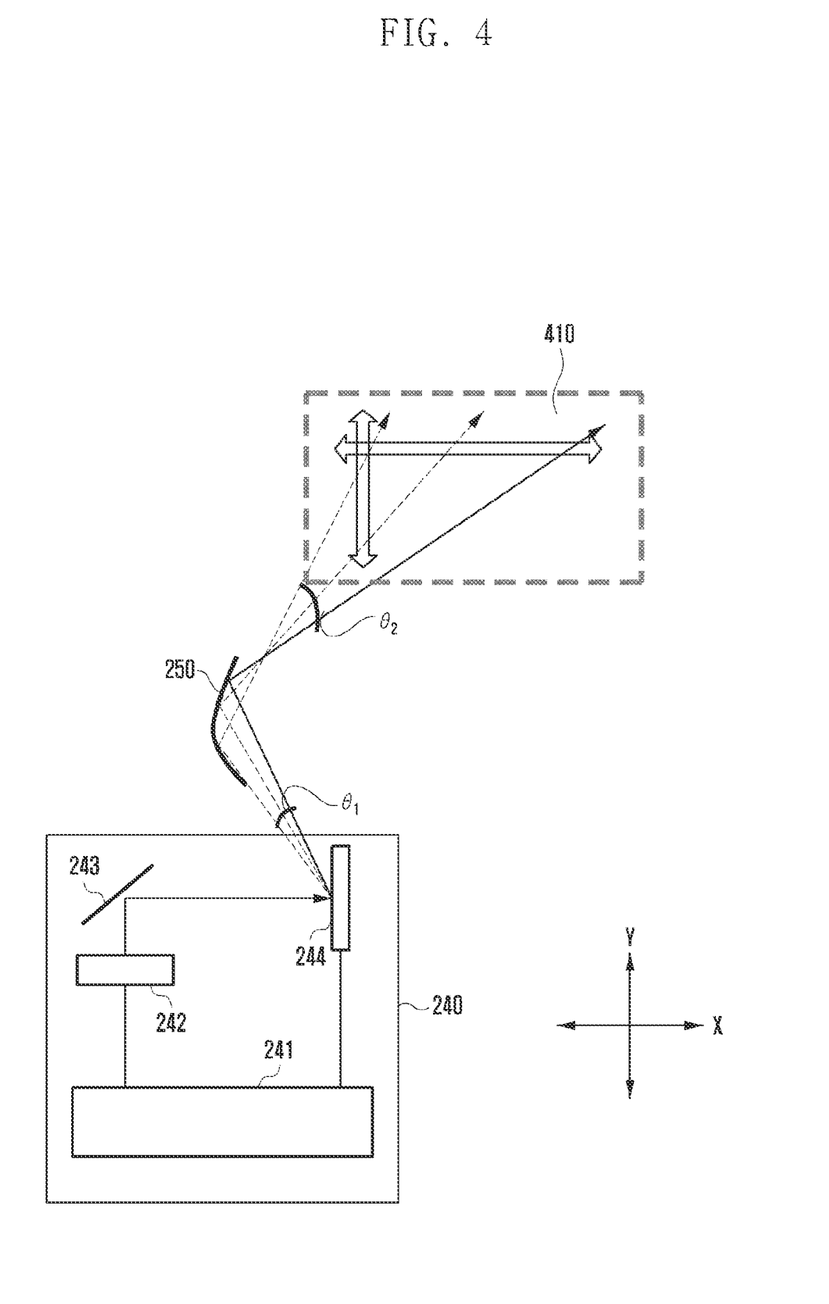
FIGS. 4 and 5 illustrate the operation of an electronic device according to an embodiment.

FIG. 4 illustrates an operation of an electronic device according to an embodiment.

The display module 240 may include a laser light source 242 that generates laser light, an auxiliary mirror 243 that reflects laser light to a scanning mirror 244, the scanning mirror 244, and a controller 241 that controls the laser light source 242 and the scanning mirror 244.

The display module 240 may be a laser scanning display (LSD). The LSD may refer to a display in which the scanning mirror 244 moving at a high speed reflects laser light so that the laser light reaches a plane of a combiner (e.g., the window member 220 in FIG. 3A). The laser light source 242 may include a plurality of light sources, each of which generates laser having wavelength corresponding to red (R), green (CO, or blue (B). The wavelength of light emitted from the laser light source 242 may be determined by the intensity of lasers generated from the plurality of light sources. The controller 241 may control the plurality of light sources depending on the image signal and thereby adjust the wavelength of the laser emitted from the laser light source 242.

The auxiliary mirror 243 may reflect the laser light emitted from the laser light source 242 to the scanning mirror 244.

The scanning mirror 244 may be rotated at a high speed by a micro electro-mechanical system (MEMS). When the scanning mirror 244 rotates, the point at which the light reflected by the scanning mirror 244 arrives may be changed. The laser light emitted from the laser light source 242 may be reflected by the scanning mirror 244 and then reach one surface of a window member 220. The point where the laser light reaches on the window member 220 may be changed in a first direction (e.g., the X direction in FIG. 4) and a second direction (e.g., the Y direction in FIG. 4) through the rotation of the scanning mirror 244. When the scanning mirror 244 rotates at a high speed, the laser light may sequentially arrive at the X-Y plane of the window member 220. Because this sequential arrival is so fast that the user's eyes cannot recognize it, a specific image 410 can be displayed by the sequential arrival of the laser light. The controller 241 may control the scanning mirror 244 to move at a high speed.

The mirror member 250 may be disposed between the display module 240 and the window member 220 where the light emitted from the display module 240 arrives. The mirror member 250 may be formed in an aspherical or free-form surface and may be formed of a material capable of reflecting the laser light emitted from the display module 240. Because of a high-speed rotation of the scanning mirror 244 in the display module 240, a second angular displacement $\theta 2$ of the laser light reflected by the mirror member 250 may be greater a first angular displacement $\theta 1$ of the laser light reflected by the scanning mirror 244. That is, the mirror member 250 in the form of an aspherical or free-form surface may amplify an angular change of the laser light by the scanning mirror 244.

Depending on the angular displacement of the laser light reflected by the scanning mirror 244 of the display module 240 and a distance between the display module 240 and the window member 220, a size of the image 410 displayed on the window member 220 may be determined. As the angular displacement increases, and as the distance between the display module 240 and the window member 220 increases, the light travel path lengthens and a size of the image 410 displayed on the window member 220 may increase. In the electronic device 200, the mirror member 250 disposed on a path through which the light emitted from the display module 240 reaches the window member 220 is capable of not only increasing the light travel path, but also amplifying the angular displacement to the second angular displacement θ2 greater than the first angular displacement θ1 of the light emitted from the display module 240, thereby increasing the size of the image 410 displayed on the window member 220. In addition, because the mirror member 250 can amplify the angular displacement, the rotation angle of the scanning mirror 244 of the display module 210 can be reduced, which enables a reduction in a size of the display module 240.

Because the mirror member 250 is capable of changing the path of light, the display module 240 may be disposed between the window members 220. Because the display module 240 is disposed between the window members 220 and the mirror member 250 transfers the light emitted from the display module 240 to the window member 220, no interference with the user's body occurs on the light transfer path.

Figure 5:
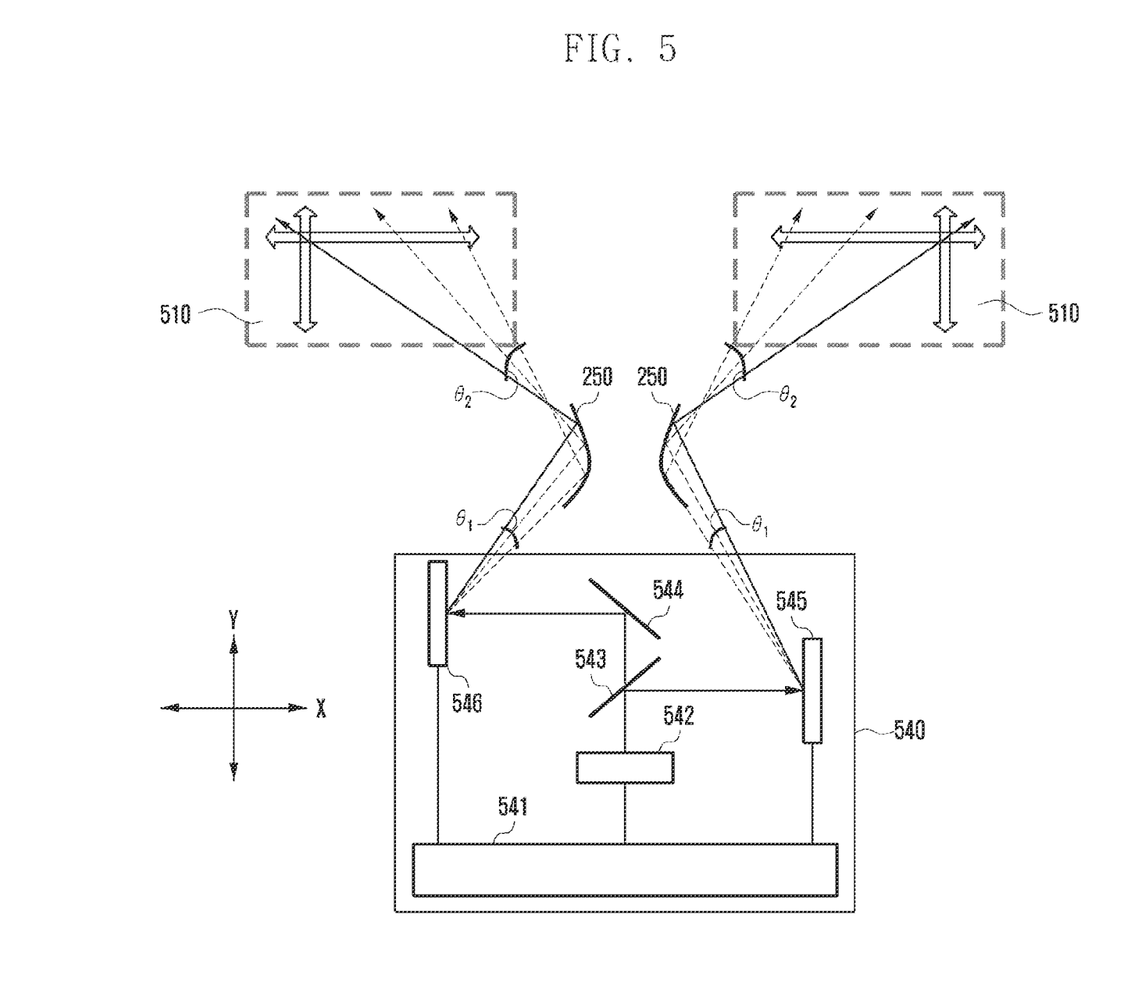

FIG. 5 illustrates the operation of an electronic device according to an embodiment.

The electronic device may include one display module 540. The display module 540 may include a laser light source 542, distribution mirrors 543 and 544, scanning mirrors 545 and 546, and a controller 541 for controlling the laser light source 542 and the scanning mirrors 545 and 546. The display module 540 may include the distribution mirrors 543 and 544 to enable laser light to reach the pair of window members. A portion of the laser light generated from the laser light source 542 may be transferred to the first scanning mirror 545 through the first distribution mirror 543. The other portion of the laser light may pass through the first distribution mirror 543, The laser light passing through the first distribution mirror 543 may be transferred to the second scanning mirror 546 through the second distribution mirror 544.

The laser light reflected by the first scanning mirror 545 moving at a high speed may be reflected by the mirror member 250 and then reach one of the pair of window members 220. The laser light reflected by the second scanning mirror 546 moving at a high speed may be reflected by the mirror member 250 and then reach the other of the pair of window members. The second angular displacement θ2 of the laser light reflected by the mirror member 250 is greater than the first angular displacement θ1 of the laser light reflected by the rotating first and second scanning mirrors 545 and 546. The mirror member 250 may amplify the angular displacement of the laser light to display a larger image 510 on the window member.

As described above, when the display module 540 including the distribution mirrors is used, the image 510 may be displayed on each member of the pair of window members through one display module 540.

Figure 6:
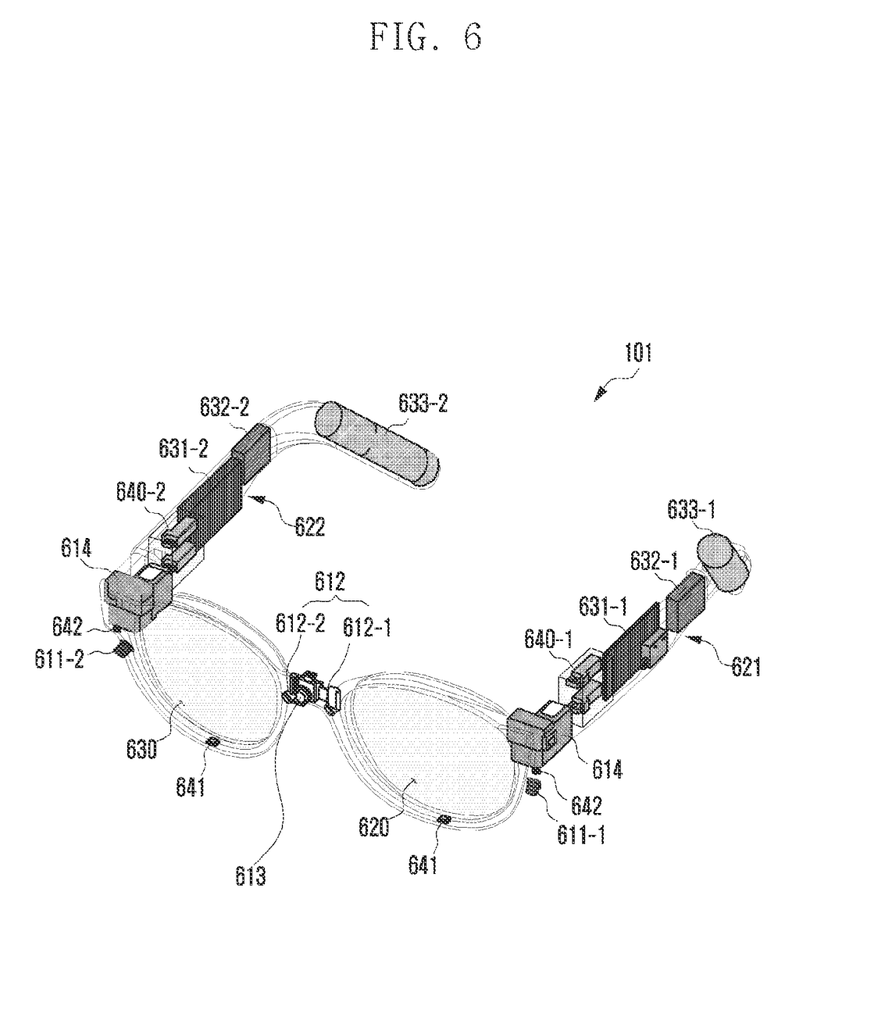
FIG. 6 illustrates the overall configuration of an electronic device including a plurality of cameras according to an embodiment.

FIG. 6 illustrates the overall configuration of an electronic device including a plurality of cameras according to an embodiment.

In FIG. 6, the electronic device 101 may be worn on a user's head to provide the user with an image related to an AR service. The electronic device 101 may provide the AR service in which at least one virtual object is output to be superimposed on an area determined as a user's field of view (FoV). For example, the area determined as the user's FoV is determined to be recognizable through the electronic device 101 by the user wearing the electronic device 101 and may include the overall or at least a part of the display module 160 of the electronic device 101. The electronic device 101 may include a first glass 620 and a second glass 630 corresponding to both eyes of the user (e.g., left eye and right eye). For example, the electronic device 101 may be configured in the form of at least one of glasses, goggles, a helmet, or a hat, but is not limited thereto.

Referring to FIG. 6, the electronic device 101 may include a display module 614, a camera module (180, an audio module 170, a first support part 621, and a second support part 622. The display module 160 may include a first glass 620 and a second glass 630. At least one camera may include a shooting camera 613 for capturing an image corresponding to the user's FoV and/or measuring a distance to an object, an eye tracking camera 612 for identifying the direction of a user's gaze, and/or gesture cameras 611-1 and 611-2 for recognizing a certain space. For example, the shooting camera 613 may photograph in a front direction of the electronic device 101, and the eye tracking camera 612 may photograph in a direction opposite to the photographing direction of the shooting camera 613. For example, the eye tracking camera 612 may photograph at least in part both eyes of the user. The first support part 621 and/or the second support part 622 may include a pair of PCBs 631-1, 631-2, a pair of speakers 632-1, 632-2, and/or a pair of batteries 633-1, 633-2.

The display module 611 may include a condensing lens and/or a transparent waveguide on the first glass 620 and the second glass 630. For example, the transparent waveguide may be positioned at least in part on a portion of the glass. The light emitted from the display module 160 may be incident on one end of the glass through the first glass 620 and the second glass 630, and the incident light may be transferred to the user through the waveguide formed on the glass. The waveguide may be made of glass, plastic, or polymer, and may include a nano-pattern, e.g., a polygonal or curved grating structure, formed on one inner or outer surface thereof. The incident light may be propagated or reflected inside the waveguide by the nano-pattern and provided to the user. The waveguide may include at least one diffractive optical element (DOE or a holographic optical element (HOE) and/or a reflective mirror. Using the at least one diffractive element or the reflective element, the waveguide may guide the display light emitted from the light source to the user's eyes.

Referring to FIG. 6, the first support part 621 and/or the second support part 622 may include the PCBs 631-1, 631-2 for transmitting an electrical signal to respective components of the electronic device 101, the speakers 632-1, 632-2 for outputting an audio signal, the batteries 633-1, 633-2, and/or hinge parts 610-1, 640-2 coupled at least in part to a body part 623 of the electronic device 101. The speakers 632-1, 632-2 may include a first speaker 632-1 for transferring an audio signal to the user's left ear and a second speaker 632-2 for transferring an audio signal to the user's right ear. Such speakers 632-1 and 632-2 may be included in the audio module 170 of FIG. 1. The electronic device 101 may include a plurality of batteries 633-1 and 633-2, which may supply power to the PCBs 631-1 and 631-2 through a power management module 188.

Referring to FIG. 6, the electronic device 101 may include a microphone 641 for receiving a user's voice and ambient sounds. The electronic device 101 may include at least one light emitting device (LED) 642 for increasing the accuracy of the at least one camera (e.g., the shooting camera 613, the eye tracking camera 612, and/or the gesture cameras 611-1 and 611-2). For example, the light emitting device 642 may be used as an auxiliary means to increase accuracy when the eye tracking camera 612 photographs the user's pupil, and the light emitting device 642 may use an infrared (IR) LED having an infrared wavelength rather than a visible light wavelength. In another example, when the gesture cameras 611-1 and 611-2 take a user's gesture, the light emitting device 642 may be used as an auxiliary means when it is difficult to detect a subject to be photographed due to a dark environment or mixing of various light sources and reflected light.

The electronic device 101 may include the body part 623 and the first support part 621 and the second support part 622. The body part 623 and the support parts 621 and 622 may be operatively connected through the hinge parts 640-1 and 640-2, The body part 623 may be mounted at least in part on the user's nose and may include the display module 160 and the camera module 180. The support parts 621 and 622 may include a support member mounted on the user's ear and may include the first support part 621 mounted on the left ear and the second support part 622 mounted on the right ear. The first support part 621 or the second support part 622 may include at least in part the PCBs 631-1, 631-2, the speakers 632-1, 632-2, and/or the batteries 633-1, 633-2. The batteries may be electrically connected to the power management module 188.

The display module 160 may include the first glass 620 and the second glass 630 and may provide visual information to the user through the first glass 620 and the second glass 630. The electronic device 101 may include the first glass 620 corresponding to the left eye and the second glass 630 corresponding to the right eye. The display module 160 may include a display panel and/or a lens (e.g., glass). For example, the display panel may include a transparent material such as glass or plastic.

The display module 160 may be formed of a transparent element, so the user may recognize a real space behind the display module 160 through the display module 160. The display module 160 may display a virtual object on at least a portion of the transparent element so that the virtual object can be seen to the user as if it were added to at least a portion of the real space. The first glass 620 and the second glass 630 included in the display module 160 may include a plurality of display panels corresponding to both eyes of the user (e.g., the left eye and the right eye).

The electronic device 101 may include a virtual reality (VR) device, in which case the first glass 620 and the second glass 630 may function as the display module 160.

The virtual object output through the display module 160 may include information related to an application program executed in the electronic device 101 and/or information related to an external object located in the real space corresponding to an area determined as a user's FoV. For example, from image information related to the real space acquired through the shooting camera. 613 of the electronic device 101, the electronic device 101 may identify an external object included in at least a portion corresponding to the area determined as the user's FoV. The electronic device 101 may output (or display) a virtual object related to the identified external object through the area determined as the user's FoV in the display area of the electronic device 101. The external object may include a thing existing in the real space. The display area in which the electronic device 101 displays the virtual object may include at least a portion of the display panel of the first display module 351 or the second display module 353. The display area may correspond to at least a portion of the first glass 620 and/or the second glass 630.

The electronic device 101 may include the shooting camera 613 (e.g., an RGB camera) for capturing an image corresponding to the user's FoV and/or measuring a distance to an object, the eye tracking camera 612 for identifying the direction of a user's gaze, and/or the gesture cameras 6114 and 611-2 for recognizing a certain space. By using the shooting camera 613, the electronic device 101 may measure a distance to an object located in the front direction of the electronic device 101. A plurality of eye tracking cameras 612 may be disposed to correspond to both eyes of the user. For example, the eye tracking camera 612 may photograph in a direction opposite to the photographing direction of the shooting camera 613. The eye tracking camera. 612 may detect the user's gaze direction (e.g., eye movement). For example, the eye tracking camera 612 may include a first eye tracking camera 612-1 for tracking the gaze direction of the user's left eye, and a second eye tracking camera 612-2 for tracking the gaze direction of the user's right eye. By using the gesture cameras 611-1 and 611-2, the electronic device 101 may detect a user gesture within a predetermined distance (e.g., a certain space). For example, there may be a plurality of gesture cameras 611-1 and 611-2, which may be disposed on both sides of the electronic device 101. Using at least one camera, the electronic device 101 may detect an eye corresponding to a primary eye and/or an auxiliary eye from among the left eye and/or the right eye. For example, the electronic device 101 may detect an eye corresponding to the primary eye and/or the auxiliary eye, based on the user's gaze direction with respect to the external object or the virtual object.

The shooting camera 613 may include a high resolution (FIR) camera and/or a photo video (PV) camera. The eye tracking camera 612 may detect the user's pupil, thereby tracking the gaze direction, and may be utilized to move the center of a virtual image along the gaze direction. For example, the eye tracking camera 612 may be divided into the first eye tracking camera 612-1 corresponding to the left eye and the second eye tracking camera 612-2 corresponding to the right eye, which may have substantially the same performance and/or specifications. The gesture cameras 611-1 and 611-2 may be used for user's hand (gesture) detection and/or spatial recognition and may include a global shutter (OS) camera. For example, in order to detect and track quick hand movements and/or minute finger movements, the gesture cameras 611-1 and 611-2 may include the OS camera with less screen afterimage such as a rolling shutter (RS) camera.

The electronic device 101 may display a virtual object related to an AR service, based on image information related to a real space acquired through a camera module 180 of the electronic device 101. The electronic device 101 may display the virtual object, based on the first display module 351 corresponding to the left eye and/or the second display module 353 corresponding to the right eye, disposed to correspond to both eyes of the user. The electronic device 101 may display the virtual object, based on predetermined setting information (e.g., resolution, frame rate, brightness, and/or display area).

The electronic device 101 may enable the first display panel included in the first glass 620 and the second display panel included in the second glass 630 to be operated as independent components, respectively. For example, the electronic device 101 may determine the display performance of the first display panel, based on first setting information, and may determine the display performance of the second display panel, based on second setting information.

The number and location(s) of one or more cameras included in the electronic device 101 shown in FIG. 6 may not be limited. For example, based on the shape or size of the electronic device 101, the number and location(s) of one or more cameras may vary.

As described above, a wearable electronic device may include a frame, a pair of window members supported by the frame, a pair of leg members rotatably connected to the frame, at least one display module disposed between the pair of window members, and at least one mirror member for reflecting light emitted from the at least one display module so that the light emitted from the display module reaches at least one of the pair of window members.

The at least one mirror member may be disposed between at least one of the pair of window members and the at least one display module.

The at least one display module may include a laser light source, a scanning mirror that reflects laser light generated from the laser light source at a plurality of reflection angles and transfers the reflected laser light to one of the pair of window members, and a controller that controls the laser light source and the scanning mirror.

The at least one mirror member may be aspherical.

A second angular displacement that is an angular displacement of laser light reflected by the at least one mirror member may be greater than a first angular displacement that is an angular displacement of laser light emitted from the at least one display module.

The electronic device may further include a support member disposed between the pair of window members, coupled to the frame, and supported by a user's body, the at least one display module may be disposed on at least one of the support member and the frame, and the at least one mirror member may be disposed on the support member.

The at least one display module may be detachably installed on at least one of the support member and the frame.

The at least one mirror member may be detachably installed on the support member.

A surface of the pair of window members may be coated with a material capable of reflecting the light emitted from the display module.

The display module may include a first distribution mirror that transfers at least a part of laser light generated from a laser light source to a first scanning mirror, and a second distribution mirror that transfers laser light passing through the first distribution mirror to a second scanning mirror, wherein laser light reflected by the first scanning mirror may reach one of the pair of window members, and wherein laser light reflected by the second scanning mirror may reach the other of the pair of window members.

Embodiments disclosed in this specification and drawings are merely specific examples provided to easily explain their technical contents and help their understanding and are not intended to limit the scope of the embodiments of the disclosure.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. An electronic device comprising:
a frame;
a pair of window members supported by the frame;
a wearing member coupled to the frame;
at least one display module disposed between the pair of window members;
at least one mirror member configured to reflect light emitted from the at least one display module and cause the emitted light to reach at least one of the pair of window members; and
a support member disposed between the pair of window members, coupled to the frame, and configured to be supported by a user's body,
wherein the at least one mirror member is disposed on the support member,
wherein the at least one mirror member is disposed between at least one of the pair of window members and the at least one display module, and
wherein a second angular displacement of laser light reflected by the at least one mirror member is greater than a first angular displacement of laser light emitted from the at least one display module.

2. The electronic device of claim 1,
wherein the wearing member includes a pair of leg members rotatably connected to the frame.

3. The electronic device of claim 1,
wherein the wearing member includes an adjuster for adjusting the wearing member.

4. The electronic device of claim 1,
wherein the at least one display module includes a laser light source, a scanning mirror that reflects laser light generated from the laser light source at a plurality of reflection angles and transfers the reflected laser light to one of the pair of window members, and a controller that controls the laser light source and the scanning mirror.

5. The electronic device of claim 1,
wherein the at least one mirror member is aspherical.

6. The electronic device of claim 1, wherein the at least one display module is disposed on at least one of the support member and the frame.

7. The electronic device of claim 6,
wherein the at least one display module is detachably installed on at least one of the support member and the frame.

8. The electronic device of claim 6,
wherein the at least one mirror member is detachably installed on the support member.

9. The electronic device of claim 1,
wherein a surface of the pair of window members is coated with a material capable of reflecting the light emitted from the display module.

10. The electronic device of claim 1,
wherein the display module includes a first distribution mirror that transfers at least a part of laser light generated from a laser light source to a first scanning mirror, and a second distribution mirror that transfers laser light passing through the first distribution mirror to a second scanning mirror,
wherein laser light reflected by the first scanning mirror reaches a first member of the pair of window members, and
wherein laser light reflected by the second scanning mirror reaches a second member of the pair of window members.

* * * * *